United States Patent Office 2,933,474
Patented Apr. 19, 1960

2,933,474
VINYL OR ALLYL SALICYLATE-ETHYLENE CO-POLYMERS AND CHELATES THEREOF

Carleton T. Handy and Henry S. Rothrock, Wilmington, Del., assignors to E. I. du Pont de Nemours and Company, Wilmington, Del., a corporation of Delaware No Drawing. Application October 2, 1958
Serial No. 764,736

21 Claims. (Cl. 260—62)

This invention relates to a new class of polymeric materials. More particularly, it relates to new organic polymers containing chelate-forming structures and to the metal chelates of these polymers. This application is a continuation-in-part of our application, Serial No. 511,780, filed May 27, 1955, now abandoned.

Crosslinked synthetic polymers in which the crosslinkages are provided by metal chelate groups have been heretofore only superficially mentioned in the published literature. Recent work, however, such as that described in application Serial No. 535,520, filed September 20, 1955, has shown that chelate crosslinked polymers have many desirable properties, including high softening temperature, insolubility in or resistance to water and the common organic solvents, and resistance to light and oxidation. This application moreover describes a process by which these polymers can be shaped into useful structures such as films, sheets, and the like.

Chelate crosslinked polymers are conveniently prepared by controlled chelation of an organic polymer containing a multiplicity of chelate-forming structures, i.e., ligand functions. However, not many such chelate-forming polymers, or polymeric polyligands, have been described in the chemical literature, and of those that are known fewer still, if any, possess per se desirable polymer properties such as stability, toughness, flexibility in film form, and the like. Moreover, most of the known polymeric polyligands are prepared by indirect methods involving introduction of chelating structures into a preformed polymer. Such methods are more likely to lead to uncertainty as regards final composition than methods involving direct polymerization or copolymerization of a nonomeric ligand.

This invention has as an object the preparation of new chelate crosslinked polymers. A further object is the preparation of new copolymers. Another object is the preparation of new films and other shaped objects. A still further object is the preparation of new filaments. Other objects will appear hereinafter.

These objects are accomplished by the present invention of copolymers of ethylene with a monomeric chelate-forming compound of the formula

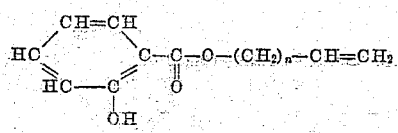

where $n$ is a cardinal number from 0 to 1, said copolymers containing, by weight, from about 0.05% to about 50% of the polymerized chelate-forming compound and at least 50% polymerized ethylene. The invention also includes as new products the chelates of these copolymers with polyvalent metals.

The new products of this invention are copolymers of vinyl salicylate or allyl salicylate with ethylene, said copolymers containing at least 50% ethylene and from about 0.05% to about 50% by weight of vinyl salicylate or allyl salicylate. These copolymers therefore contain a multiplicity of recurring chelate-forming structures of the type

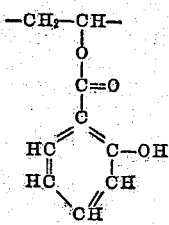

in the case of vinyl salicylate, or

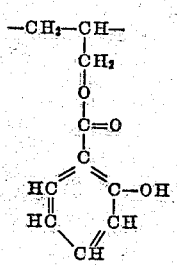

in the case of allyl salicylate. Such polymers are capable of forming with polyvalent metals chelated products which are crosslinked through the six-membered chelate rings. To illustrate, with a divalent metal Me and polymers containing vinyl salicylate units, the resulting chelated polymer will be crosslinked through units of the type

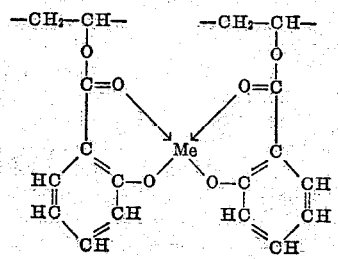

where the ring arrows represent coordinate linkages. More complex spatial structures are formed when the chelating metal has a valence higher than two.

The linear, metal-free copolymers are prepared, according to known methods, by polymerizing together in suitable proportions vinyl or allyl salicylate with ethylene. In addition to the two essential components, the copolymers may contain other polymerized vinyl monomers, e.g., isobutylene, vinyl acetate, 1,3-butadiene, methyl methacrylate, and the like in minor amounts, e.g., up to 20% by weight of the total polymerized materials. Such minor amounts of other constituents, among which vinyl acetate is the preferred one, do not appreciably affect the chelate-forming properties of the copolymer but may serve to improve desirable properties such as organic solvent solubility and pliability. However, it is undesirable to have present in the copolymer more than about 20% of such third components since, beyond this point, the compositions tend to be undesirably less tough and to become objectionably tacky and pressure-sensitive.

The chelate crosslinked polymers which are also part of this invention are preferably prepared by the process of application Serial No. 535,520, already referred to, This new process, which has been called transchelation, consists broadly in treating an organic compound (e.g., a polymer) containing a plurality of chelate-forming structures with a chelate of a polyvalent metal with a volatile chelating agent, i.e., a chelating agent boiling below 300° C. at 760 mm. pressure, and evaporating the volatile chelating agent, thereby leaving a polymer crosslinked through metal chelate groups. What takes place in this process is a ligand exchange, organic compounds containing chelating structures being termed ligands, that is, a transfer of the metal from the chelating structure of the volatile chelating agent to those of the non-volatile polyligand. When the number $m$ of chelate-forming structures in the non-volatile polyligand and the principal valence $n$ of the metal are each at least two and the sum of $m$ and $n$ is at least five, a chelated polymer is formed and crosslinking through chelate rings takes place between the polymer molecules.

The outstanding advantage of the transchelation process just described is that the non-volatile polyligand and the polyvalent metal chelate of a volatile chelating agent can be combined in intimate admixtures, such as homogeneous solutions, without precipitation of the crosslinked, chelated polymer. Thus, these intimate mixtures can be formed, stored and handled at will, and it is only on removal of the volatile materials by evaporation that formation of the crosslinked polymer takes place. This is because an equilibrium between ligands and metal exists in the solutions, which is shifted, with formation of the chelate crosslinked polymer, only when the volatile ligand is removed.

When, as is normally the case, a shaped structure of the chelate crosslinked polymer is desired, the shaping is done essentially concurrently with the removal of the volatile chelating agent, e.g., by casting, extruding or pressing objects such as film, sheets, filaments, molded structures and the like, and completing the evaporation of the volatile materials as needed. In cases where the chelated composition is moldable at high temperatures, shaping may be accomplished subsequently to chelation.

The intimate mixture of the polymeric polyligand and metal chelate of a volatile chelating agent need not be a homogeneous solution at room temperature. It is only necessary that its components form a homogeneous system at the temperature at which the shaped object is being formed. Additional inert solvents are not essential but are often used to aid in forming a solution. It is often desirable to add to the mixture a small additional amount of a volatile chelating agent, e.g., acetylacetone, as insurance against premature gelation of the chelate crosslinked polymer.

The relative proportions of polymeric polyligand and polyvalent metal chelate of a volatile chelating agent can be such that there is present the calculated quantity of metal sufficient to chelate all the salicylate groups in the polyligand. Assuming complete chelation, this would yield, when the starting copolymer contains the maximum amount (50% by weight) of chelate-forming salicylate monomer, a chelated polymer containing about 0.15 gram atom of metal per 100 g. of polymer with divalent metals, and proportionately less with higher than divalent metals. However, in general, chelated polymers containing less than that amount of metal are preferred because of their greater flexibility and homogeneity. While the chelated polymers should contain at least 0.005 gram atom of metal per 100 grams of polymer weight to realize the benefits of crosslinking, it is preferred that they contain not more than 0.1, and still more preferably between about 0.01 and 0.06 gram atom of metal per 100 grams of polymer weight. The desired quantity of metal can be introduced either by reacting a polyligand containing relatively few salicylate groups with the calculated amount of metal chelate, or by reacting a polyligand richer in salicylate groups with less than the calculated amount of metal chelate.

In addition to the transchelation method just described, which is illustrated in Examples XI–XX and XXII–XXIIII below, other methods can be used to chelate the ethylene/vinyl- or allyl salicylate copolymers. One of these methods, illustrated in Example XXI, involves an alcohol exchange, or acoholysis, process wherein the ethylene/salicylic ester copolymer is reacted with a polyvalent metal alcoholate of a volatile alkanol. What takes place is an alcohol exchange between the phenolic hydroxyls of the salicylic ester groups and the alkoxy groups of the metal alcoholate, with simultaneous formation of chelate rings, as depicted by the following equation, using vinyl salicylate unit and aluminum triethoxide as illustrative reactants:

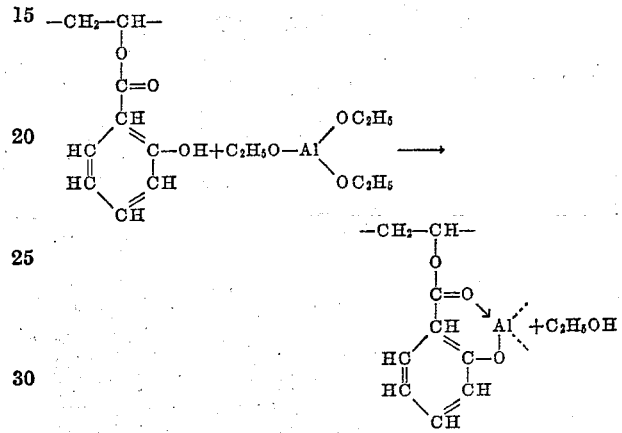

where the dotted lines represent portions of chelate rings similar to the one shown. Again, with a polyvalent metal alcoholate and a polymer containing a multiplicity of salicylate units, crosslinking through chelate rings will take place between the polymer chains. As in the transchelation process, the relative proportions of polymeric polyligand and polyvalent metal alcoholate are so chosen that a chelated polymer containing the amount of metal specified above is formed. This procedure differs from the transchelation method in that it is essentially an irreversible reaction and the chelate crosslinked polymer separates from the reaction mixture as an insoluble material. However, and particularly if the reaction is carried out at elevated temperature, the chelate crosslinked polymer is sufficiently plastic to permit its being milled and sheeted, or molded. Alternatively, the unchelated polymer can first be shaped into the desired structure, which is then immersed in a solution of the polyvalent metal alkoxide in a suitable solvent, whereby chelation takes place at least at the surface of the object being treated.

Still another method of preparing chelate crosslinked polymers from the ethylene/vinyl- or allyl salicylate copolymers consists in treating the copolymer, preferably dissolved in a suitable solvent, with a polyvalent metal ion in the form of a metal salt or oxide, dissolved in an organic or organic-aqueous solvent such as methanol or methanol-water, or even in water. Preferably there is used a salt of a polyvalent metal with a weak acid, e.g., an acid having a dissociation contant below about $1 \times 10^{-3}$, for example cupric acetate, ferric acetate, zinc propionate, aluminum acetate, etc. This procedure is less applicable to the preparation of shaped structures since the chelated polymer generally separates at once from the mixture as an insoluble preciptate. However, it is a convenient method for obtaining the chelated polymer in bulk form when this is desired.

The chelate crosslinked polymers obtained by any of the above-described methods are high softening and insoluble in the solvents in which the non-chelated polymers are soluble. They are, however, softened or even dissolved by chelating solvents.

The invention is illustrated in greater detail by the examples below. The monomeric vinyl salicylate and allyl salicylate used in these examples can be prepared as follows:

*Vinyl salicylate.*—This material was prepared by a modification of the general method described in U.S. Patent 2,299,862 for the preparation of vinyl esters. In a typical run, 8600 g. (100 moles) of redistilled vinyl acetate, 3450 g. (25 moles) of salicyclic acid, 60 g. of mercuric acetate and 8.5 ml. of concentrated sulfuric acid were charged into a stirred kettle. The resulting slurry was stirred at 25° C. for a total of five days. The excess salicyclic acid was removed by filtration, and 100 g. of sodium acetate was added to the filtrate and stirred for one hour to neutralize the catalyst. The excess vinyl acetate was then removed at 25° C. under reduced pressure. The residue was again filtered. The combined solids were washed with benzene and the filtrates were combined and distilled rapidly under reduced pressure through a short column. The fraction boiling between 62° C.-85° C. at 3 mm. pressure (839 g.) was collected (some gas was observed at the end of the distillation). A residue of 860 g. of a viscous tar remained. The distillate was then refractionated, separating 715 g. of vinyl salicylate boiling at 72° C.-73° C. at 2.5 mm. pressure, $n_D^{25}$ 1.5477.

*Allyl salicylate.*—This compound can be prepared by the process described in German Patent 244,208. A better procedure is the ester exchange reaction between methyl salicylate and allyl alcohol using sodium methylate as the catalyst. In a typical run, 304 g. of methyl salicylate, 500 g. of allyl alcohol and 1 g. of sodium methylate were heated under a distilling column for 12½ hours, removing the methanol as it was formed. At the end of this period, 92% of the theoretical amount of methanol had been collected. The excess allyl alcohol was removed from the remaining material by evaporation at 40 mm. pressure on a steam bath, and the residue was dissolved in 500 ml. of diethyl ether. This solution was washed with water, dried and distilled. There was obtained 214 g. of allyl salicylate boiling at 82° C. at 2 mm. pressure, $n_D^{25}$ 1.5326.

In the examples which follow, the inherent viscosities were determined on solutions of the copolymers at 0.1% concentration in tetrahydronaphthalene at 125° C. The vinyl salicylate or allyl salicylate contents of the copolymers were determined by infrared analysis or were calculated from the saponification equivalents, determined in pyridine. In case of terpolymers involving two or more saponifiable groups, the salicylic ester content was selectively determined by infrared analysis.

EXAMPLE I

An ethylene/vinyl salicylate copolyer was prepared as follows: an emulsion of 10 g. of vinyl salicylate in 50 ml. of water containing 0.6 g. of potassium dihydrogen phosphate, 1.0 g. of technical sodium dodecylsulfate and 0.2 g. of benzoyl peroxide was adjusted to a pH of 6.0 by addition of potasisum hydroxide and charged into a pressure vessel. The vessel was pressured with ethylene, heated to 73° C.-75° C. and the ethylene pressure was adjusted to 950 atmospheres. After eight hours of heating with agitation at the indicated temperature and pressure, the vessel was cooled, the pressure was released and the polymeric product was freed from unreacted monomers by steam distillation. There was obtained 6 g. of an ethylene/vinyl salicylate copolymer having the appearance of a white sponge. This copolymer contained 17% of polymerized vinyl salicylate and had an inherent viscosity of 0.72.

EXAMPLE II

A pressure vessel containing 25 g. of vinyl salicylate, 50 ml. of benzene and 0.2 ml. of di(tert.-butyl)-peroxide was pressured with ethylene and held at an ethylene pressure of 900–950 atmospheres and a temperature of 135° C. for eight hours with agitation. The resulting ethylene/vinyl salicylate copolymer (54 g.), after steam distillation and extraction with acetone, was a homogeneous white sponge of inherent viscosity 1.51. It contained 13% of polymerized vinyl salicylate. Films prepared from this copolymer by solvent casting or melt pressing at 220° C. were clear, tough and had a zero strength temperature of 100° C.

EXAMPLE III

Example II was repeated using 10 g. of vinyl salicylate and a heating period of 3.5 hours. There was obtained 73 g. of ethylene/vinyl salicylate copolymer containing 5.5% of polymerized vinyl salicylate and having an inherent viscosity of 1.58. A self-supporting film of this copolymer had a cold crack temperature below −70° C., a tear strength of 820 g. and a tensile strength of 1500 lbs./sq. in. Its dielectric constant was 2.4.

EXAMPLE IV

Example II was repeated using 50 g. of vinyl salicylate. There was obtained 20 g. of ethylene/vinyl salicylate copolymer as a transparent resin having an inherent viscosity of 0.69 and containing 19% of polymerized vinyl salicylate. This copolymer was readily molded or extruded into objects such as bars or sheets. A cast film was pliable and readily cold drawn. It had a tenacity of 1580 lbs./sq. in. at 730% elongation.

EXAMPLE V

Using the procedure of Example II with 50 g. of vinyl salicylate, 100 ml. of benzene and 0.2 ml. of di(tert.-butyl)peroxide, there was obtained 48 g. of ethylene/vinyl salicylate copolymer as a transparent resin having an inherent viscosity of 1.62 and containing 26% of polymerized vinyl salicylate. This polymer was converted to clear, tough, pliable, films by hot pressing or solvent casting. A film so prepared melted at 95° C., had a tensile strength of 3540 lbs./sq. in., a break elongation of 54% and an initial modulus of 1570.

EXAMPLE VI

A pressure vessel containing 50 g. of vinyl salicylate, 100 ml. of chlorobenzene and 0.4 ml. of di(tert.-butyl)-peroxide was pressured with ethylene and held at an ethylene pressure of 600–650 atmospheres and at a temperature of 130° C. for four hours with agitation. The resulting ethylene/vinyl salicylate copolymer (15 g.) after steam distillation and extraction with acetone was a transparent resin of inherent viscosity 0.51. It contained 35% of polymerized vinyl salicylate. This polymer could be converted to a pliant film by hot pressing.

EXAMPLE VII

A ternary copolymer of ethylene, vinyl salicylate and and vinyl acetate was prepared as follows: A pressure vessel was charged with 20 g. of vinyl salicylate, 20 g. of vinyl acetate, 50 ml. of benzene and 0.2 ml. di(tert.-butyl)peroxide, closed, heated to 135° C. and pressured with ethylene to 900–950 atmospheres pressure. The vessel was maintained at that temperature and pressure for eight hours with agitation. The resulting polymer was steam distilled and extracted with acetone. There was obtained 41 g. of a transparent resin, having an inherent viscosity of 1.29. This was a ternary copolymer containing, by weight, 82% of polymerized ethylene, 10% of vinyl salicylate and 8% of vinyl acetate. Films of this composition pressed at 115° C. were clear and tough.

EXAMPLE VIII

A pressure vessel containing 20 g. of vinyl salicylate, 20 g. of vinyl acetate, 50 ml. of tert.-butyl alcohol and 0.2 g. of $\alpha,\alpha'$-azodiisobutyronitrile was pressured with ethylene to 500 atmospheres at 70° C. and held at that temperature and pressure for eight hours with agitation. The reaction product after steam distillation and acetone extraction consisted of 15 g. of a transparent resin having an inherent viscosity of 0.51. This was a ternary copolymer of ethylene, vinyl salicylate and vinyl acetate containing 11% of polymerized vinyl salicylate and 17% of polymerized vinyl acetate. Pliable self-supporting films were obtained from this copolymer by pressing at 175° C.

EXAMPLE IX

An ethylene/allyl salicylate copolymer was prepared as follows: A pressure vessel was charged with 25 g. of allyl salicylate, 50 ml. of benzene and 0.2 ml. di(tert.-butyl)-peroxide. The vessel was pressured to 900 atmospheres with ethylene at 135° C. and maintained with agitation at that temperature and pressure for four hours. The resulting polymer was steamed and extracted with acetone. There was obtained 68 g. of a transparent copolymer of ethylene and allyl salicylate having an inherent viscosity of 0.64 and containing 14% of polymerized allyl salicylate.

EXAMPLE X

A ternary copolymer of ethylene, allyl salicylate and vinyl acetate was prepared as follows: A pressure vessel containing 12 g. of allyl salicylate, 12 g. of vinyl acetate, 50 ml. of benzene and 0.2 ml. of di(tert.-butyl)peroxide was pressured with ethylene to 950 atmospheres at 135° C. The vessel was held at that temperature with agitation for eight hours without repressuring. There was obtained after steam distillation and acetone extraction 42 g. of a ternary copolymer (inherent viscosity 0.43) of ethylene, allyl salicylate and vinyl acetate. This copolymer containing 10% of polymerized allyl salicylate and 9% of polymerized vinyl acetate. It gave pliable films by pressing at 175° C.

EXAMPLE XI

A casting solution was prepared from 15 g. of the ethylene/vinyl salicylate copolymer of Example III (containing 5.5% of vinyl salicylate), 0.39 g. of tris(acetylacetono)-aluminum (sufficient to chelate 75% of the chelating groups in the polymer), 120 ml. of xylene and 15 ml. of acetylacetone, the latter being added to prevent premature gelation of the crosslinked chelate polymer. Since the ethylene/vinyl salicylate copolymers are not soluble in cold xylene, but are soluble in xylene at temperatures above about 70° C., this solution was cast, at a temperature of 105° C., on a nickel plate heated to 90° C., giving a homogeneous viscous film. The solvent and volatile chelating agents were evaporated at 90° C., and the resulting film heated at 125° C. for one hour to complete the transchelation. There remained a strippable, 3-mil thick film of ethylene/vinyl salicylate copolymer crosslinked through the chelate rings formed by the aluminum and the salicylate groups. This film, which contained 0.22% aluminum (0.008 g. atom/100 g.) was insoluble in boiling xylene, although somewhat swollen by it. It had a break elongation of 780% and a tenacity of 2400 lbs./sq. in. It remained pliable at temperatures as low as −72° C., did not melt at 160° C. and was heat sealable at 190° C. When coated onto a steel plate, the bond showed good adhesion.

The table below summarizes some of the film properties of this chelated polymer as compared with the corresponding properties of a film of comparable thickness of the original (unchelated) ethylene/vinyl salicylate copolymer.

|  | Unchelated Polymer | Chelated Polymer |
| --- | --- | --- |
| Cold crack, °C | <−70 | <−70 |
| Zero strength temperature, °C | 95 | 190 |
| Tensile strength, lbs./sq.in | 1,500 | 2,400 |
| Break elongation, percent | 360 | 730 |
| Initial modulus | 4,050 | 4,500 |
| Dielectric constant | 2.4 | 2.4 |

EXAMPLE XII

A hot casting solution was prepared from 10.3 g. of an ethylene/vinyl salicylate copolymer containing 13% of vinyl salicylate, 1.01 g. of tris(ethyl acetoacetato)-aluminum (90% chelate equivalence), 10 ml. of acetylacetone and 90 ml. of xylene. This was cast on a nickel plate heated to 90° C., then heated at 125° C. to evaporate solvent and volatile chelating agents and complete the chelate exchange. There was left a colorless, transparent, tough self-supporting film of ethylene/vinyl salicylate copolymer crosslinked through aluminum chelate rings. This film, which contained 0.63% aluminum (0.023 gram atom per 100 g. of polymer) was insoluble in boiling xylene, and still retained significant strength at 185° C., as compared with a softening point of 100° C. for the non-chelated copolymer. Other film properties included a tenacity of 3500 lbs./sq. in., a break elongated of 290% and an initial modulus of 7000. Such films are heat sealable at 230° C. to give homogeneous bonding. They can be drawn in one direction at temperatures of 90° C.–135° C. to give products with lower elongation and much higher tenacity and modulus.

EXAMPLE XIII

A casting solution was prepared from 15 g. of the ethylene/vinyl salicylate copolymer of Example II, 2.02 g. of bis(butylacetoacetato)copper II (90% chelate equivalence), 120 ml. xylene and a 5 ml. excess of butyl acetoacetate. A film was cast and baked as in Example XI. There was obtained a tough, homogeneous green film of ethylene/vinyl salicylate crosslinked through copper chelate rings. This product contained 2.2% of copper (0.034 gram atom per 100 g. of polymer). The film had a tenacity of 4040 lbs./sq. in., a break elongation of 425% and an initial modulus of 11,600. The polymer was insoluble in boiling xylene. It showed substantially no deterioration after 500 hours of exposure to ultraviolet light.

EXAMPLE XIV

A hot casting solution was prepared from 8.96 g. of an ethylene/vinyl salicylate copolymer containing 18.3% of vinyl salicylate, 65 ml. of xylene, 5 ml. of acetylacetone and 0.90 g. (75% chelate equivalence) of tetrakis (acetylacetono)zirconium. This solution was cast and cured as described in Example XI. There was obtained a clear, tough film of ethylene/vinyl salicylate copolymer crosslinked through zirconium chelate rings. This film, which was insoluble in boiling xylene, contained 1.9% zirconium (0.021 g. atom/100 g.). It showed no substantial deterioration after immersion in boiling water for 30 minutes. The table below shows some of the film properties of this chelated polymer as compared with the corresponding properties of the original, unchelated polymer.

|  | Unchelated Polymer | Chelated Polymer |
| --- | --- | --- |
| Zero strength temperature, °C | 85 | 230 |
| Tensile strength, lbs./sq.in | 1,600 | 2,840 |
| Break elongation, percent | 730 | 380 |
| Initial modulus | 2,900 | 7,000 |

EXAMPLE XV

The ternary ethylene/vinyl salicylate/vinyl acetate copolymer of Example VII was used to prepare a chelate crosslinked polymer as follows: A hot (105° C.) casting solution was prepared from 16.4 g. of the ternary copolymer, 130 ml. of xylene, 5 ml. of acetylacetone and 0.70 g. (75% chelate equivalence) of tris(acetylacetono) aluminum. This solution was cast and cured as in Example XI to give a clear, tough film, insoluble in boiling xylene, of copolymer cross-linked through aluminum chelate ring. A sample of the casting composition deposited on steel showed good adhesion to the metal. The chelated polymer contained 0.35% aluminum (0.013 g. atom per 100 g.).

EXAMPLE XVI

Hot casting solutions were prepared as follows:

| | | |
|---|---|---|
| Ethylene/vinyl salicylate copolymer of 18% vinyl salicylate content, gm | 9.15 | 9.15 |
| Xylene, ml | 85 | 100 |
| Acetoacetone, ml | 2 | 2 |
| Butyl acetoacetate, ml | 5 | 5 |
| bis(Butyl acetoacetato)nickel[1], gm | 0.3 | 1.4 | the chelate equivalence of the nickel compound employed being 18% and 75%, respectively, based on the copolymer. These solutions were cast and cured as in Example XI. The resulting films were tough, clear with a pale green coloration. The properties of these films, which contained 0.009 and 0.040 g. atoms of metal/100 g., are tabulated below:

| | Polymer chelated with 16% equivalence nickel | Polymer chelated with 75% equivalence nickel |
|---|---|---|
| Zero strength temperature, °C | 220 | 250 |
| Tensile strength, lbs./sq. in | 3,780 | 4,150 |
| Break elongation, percent | 445 | 220 |
| Modulus | 5,100 | 5,600 |

EXAMPLE XVII

A solution, stable at room temperature, was prepared from 11.1 g. of the ethylene/vinyl solicylate/vinyl acetate copolymer of Example VIII, 0.6 g. (75% chelate equivalence) of tris(acetylacetono)aluminum, 5 ml. of acetylacetone and 67 ml. of xylene. This solution was cast on glass plate and the solvent and volatile chelating agent were removed by slow warming. Completion of the cure was effected by heating at 125° C. under reduced pressure for 30 minutes. The resulting tough, transparent film (3.4 mil thick) of polymer crosslinked through aluminum chelate rings contained 0.46% aluminum (0.017 g. atom/100 g. of polymer weight). This film retained its strength at 145° C. It had a tenacity of 2890 lbs./sq. in., a break elongation of 350% and an initial modulus of 2790.

EXAMPLE XVIII

A casting solution was prepared from 12.8 g. of an ethylene/vinyl salicylate copolymer containing 26% of vinyl salicylate (the product of Example V), 1.62 g. of tris(acetylacetono)aluminum, 5 ml. of acetylacetone and 100 ml. of xylene. The hot solution (105° C.) was cast on a nickel plate as in Example XI. The resulting chelate crosslinked film, which contained 1.05% aluminum (0.039 g. atom of metal/100 g. of polymer) was clear, strong and pliant with low elongation. The following table summarizes some of its properties in comparison with those of the unchelated polymer.

| | Unchelated Polymer | Chelated Polymer |
|---|---|---|
| Cold crack, °C | <−70 | <−70 |
| Zero strength temperature, °C | 95 | 270 |
| Tensile strength, lbs./sq. in | 3,540 | 3,800 |
| Break elongation, percent | 540 | 150 |
| Initial modulus | 1,570 | 4,190 |

EXAMPLE XIX

A hot casting solution was prepared from 13.1 g. of the ethylene/allyl salicylate copolymer of Example IX, 0.81 g. of tris(acetylacetono)aluminum, 5 ml. of acetylacetone and 95 ml. of xylene. This was cast on a metal plate heated to 90° C. After evaporation of the solvent, the volatile ligand was removed by heating at 125° C. for one hour. The properties of the cured product and of an unchelated control film are summarized below.

| | Unchelated Polymer | Chelated Polymer |
|---|---|---|
| Zero strength temperature, °C | 75 | 170 |
| Break elongation, percent | 160 | 180 |
| Tensile strength, lbs./sq. in | 830 | 990 |
| Initial modulus | 5,540 | 5,870 |

EXAMPLE XX

A hot casting solution was prepared from 16.4 g. of the ethylene/allyl salicylate/vinyl acetate copolymer of Example X, 100 ml. of xylene, 5 ml. of acetylacetone and 0.81 g. (75% chelate equivalence) of tris(acetylacetono)aluminum. The solution was cast as in Example XI. The resulting self-supporting film, which contained 0.43% aluminum (0.015 g. atom/100 g. of polymer) was brilliantly clear. The table below lists some of its properties compared with those of the unchelated film.

| | Unchelated Polymer | Chelated Polymer |
|---|---|---|
| Cold crack, °C | 0 | <−73 |
| Zero strength temperature, °C | 70 | 145 |
| Tensile strength, lbs./sq. in | 600 | 1,500 |
| Break elongation, percent | 255 | 410 |
| Initial modulus | 3,700 | 5,800 |

EXAMPLE XXI

This example illustrates chelation by the alcohol exchange method. A mixture of 31 g. of an ethylene/vinyl salicylate copolymer containing 16% of vinyl salicylate and 1.02 g. of aluminum isopropoxide was blended on heated rolls at a temperature in the range of 100° C.–180° C. This amount of aluminum isopropoxide was equivalent to 50% of the salicylate groups and corresponded to 0.016 g. atom of aluminum per 100 g. of the final polymer. There was obtained, with simultaneous evaporation of the isopropyl alcohol, a tough sheet of chelate crosslinked polymer, from which a pliable film was pressed at 260° C. This film did not melt below 150° C. and was insoluble in hot xylene.

The following examples illustrate the formation of shaped objects other than thin films from the chelate crosslinked polymers of this invention.

EXAMPLE XXII

A mixture of 47 g. of an ethylene/vinyl salicylate containing 13.6% vinyl salicylate and 2.09 g. (50% chelate equivalence) of tris(acetylacetono)aluminum was charged into a screw extruder heated to 125° C. About 1 ml. of acetylacetone was added and the mixture was extruded as a monofilament. The extrudate was cut and repassed successively through the extruder at 150° C., 200° C., and 210° C. to give a fused, rubbery monofilament of chelate crosslinked polymer. Curing was completed by heating the filament under tension in a vacuum oven at 150° C. for one hour, giving a rubbery monofil completely insoluble in boiling xylene.

EXAMPLE XXIII

A mixture of 163 g. of an ethylene/vinyl salicylate copolymer containing 12% vinyl salicylate, 9 g. (75% chelate equivalence) of tris(acetylacetono)aluminum, 15 g. of acetylacetone and 150 g. of cyclohexanone was blended in a closed mechanical mixer at 100° C. The resulting gum was worked on a rubber mill heated to 180° C. This caused evaporation of the volatile chelating agent and of the solvent and gave a translucent sheet, 0.25 inch thick, of chelate crosslinked polymer. This sheet could be molded or extruded readily at 200° C.–225° C. Thus, a bar 5" x 0.5" x 0.25" was molded at 200° C. and 500 lbs./sq. in. pressure. In an extrusion mold having an orifice 0.315" in diameter, the chelated polymer had a melt index at 220° C. of 10.2 g. per 10 minutes at a loading of 4753 g. A 6 mil thick film pressed from this polymer at 225° C. had a tenacity of 2500 lbs./sq. in., a break elongation of 720% and an initial modulus of 4970. It was still tough and without brittleness at −70° C.

EXAMPLE XXIV

Using the procedure of Example XXIII, transchelation in the absence of a solvent was effected when 55 g. of an ethylene/vinyl salicylate copolymer containing 20% vinyl salicylate was blended with 2.6 g. of tris(acetylacetono)-aluminum on rolls heated to 100° C. and then heated to 150° C. for 30 minutes. This amount of tris-(acetylacetono)aluminum was sufficient to satisfy 35% of the salicylate groups and to provide a polymer containing 0.014 g. atom of aluminum per 100 g. The resulting cured sheet of chelate crosslinked polymer was pressed into soft, transparent films at 210° C. These films were insoluble in hot xylene and were not brittle at −40° C. The tensile strength was 3600 lbs./sq. in. at 460% elongation and the initial modulus was 1775, indicating a highly pliable product.

The copolymers obtained by the methods described in the preceding examples contain substantial quantities of the salicylic ester. The methods are broadly applicable to the preparation of copolymers containing much smaller quantities of the salicylic ester, as low as 0.05% by weight. The following examples illustrate the preparation of copolymers which contain a low proportion of the salicylic ester.

EXAMPLE XXV

A pressure vessel of 400 ml. capacity was charged with 100 ml. of thiophene-free benzene, 0.15 mol of di(tert.-butyl)peroxide and 2 g. of vinyl salicylate. The vessel was chilled, evacuated to remove air and placed in a shaking apparatus. The temperature was raised to 150° C. during 50 minutes and ethylene was introduced gradually over a period of 1.5 hours until a pressure of 900 atmospheres was reached. The reaction was maintained at a temperature range of 128–142° C. and a pressure of 800–900 atmospheres for 2.5 hours. The reaction vessel was then cooled, the pressure was released and the polymeric product was free from solvent and unreacted material by steam distillation. The solid copolymer was dried, extracted with acetone in a Soxhlet apparatus for 8 hours and dried again. There was obtained 27 g. of a solid copolymer which was shown by infrared analysis to contain about 1% vinyl salicylate. It had an inherent viscosity of 5.1.

EXAMPLE XXVI

Using the procedure described in Example XXV a mixture of 4.0 g. of vinyl salicylate and 0.2 ml. of di(tert.-butyl)peroxide in 100 ml. of thiophene-free benzene was heated under ethylene at a pressure of 800–900 atmospheres for 4 hours. The temperature was maintained at 132–140° C. except for a brief period at the end of the reaction when the temperature rose to 182° C. There was obtained 52 g. of ethylene/vinyl salicylate copolymer which was shown by infrared analysis to contain about 1.5% of vinyl salicylate. The copolymer had an intrinsic viscosity of 3.54.

EXAMPLE XXVII

Using the procedure described in Example XXV, a mixture of 2.5 g. of allyl salicylate and 0.2 ml. of di-(tert.-butyl)peroxide in 100 ml. of thiophene-free benzene was heated to 135° C. and ethylene was introduced over a period of 2.25 hours to produce a pressure of 700 atmospheres. The temperature rose to 175° C. at this point and the reaction vessel was cooled with a compressed air stream until the temperature dropped to 140° C. The reaction was then maintained at 135° C. for 1.5 hours under an ethylene pressure of 900 atmospheres. When the reaction mixture was treated as described in Example XXV there was obtained an ethylene/allyl salicylate copolymer which contained, as calculated from the saponification number, 2.5% of allyl salicylate.

EXAMPLE XXVIII

Using the procedure described in Example XXV, a mixture of 5.0 g. of allyl salicylate and 0.2 ml. of di-(tert.-butyl)peroxide in 100 ml. of thiophene-free benzene was heated at 135–146° C. for about 16 hours under an ethylene pressure of 850–900 atmospheres. There was obtained 46 g. of ethylene/allyl salicylate copolymer which contained, as calculated from the saponification number, 3.6% of allyl salicylate. The inherent viscosity of the copolymer was 3.27.

Ethylene/allyl salicylate copolymers which contain 1.4, 1.5 and 1.6% of allyl salicylate have been prepared by methods which are similar to those described in the preceding examples.

Films of the copolymers which contain as little as 1% of the salicylate component have surprising resistance to degradation by light, as shown in the tests described in the following paragraphs.

Films of 5 mils thickness were prepared from each of the copolymers of Examples XXV–XXVIII, inclusive, using a hydraulic press with heated platens. The platens were heated to a temperature necessary to obtain good flow of the copolymer and sufficient pressure was applied to the platens to obtain a film of the desired thickness, that is, 5 mils. Strips of the films were attached firmly to a frame and they were then exposed to the light of four twenty-watt fluorescent sunlamps (Westinghouse No. FS20T12) in a box, the distance from the lamps to the strips being 2½". A reflector was placed behind each lamp. The temperature in the box was about 45° C. The positions of the film strips in the box were changed at regular intervals to assure uniform exposure of each strip to the light source. Each strip was tested manually for tear-resistance and the film strip was judged to have failed when it showed low elongation and tore readily when pulled. The elapsed hours before failure for each of the copolymers and for a control commercial polyethylene are as follows:

| Copolymer | Hrs. to Failure |
| --- | --- |
| Ethylene/vinyl salicylate (1%) (Example XXV) | 650 |
| Ethylene/vinyl salicylate (1.5%) (Example XXVI) | 480 |
| Ethylene/allyl salicylate (2.5%) (Example XXVII) | 750 |
| Ethylene/allyl salicylate (3.6%) (Example XXVIII) | 650 |
| Polyethylene—Control | 280 |

In a second series of tests a copolymer of ethylene/allyl salicylate containing 1.4% of allyl salicylate was blended with 0.1% by weight of an antioxidant (purified dialkylphenol sulfide crystals) and then extruded to form a 10 mil flat film. A control film of commercial polyethylene (also blended with 0.1% of the antioxidant) was prepared in the same manner. Films of the blended compositions were exposed in an Atlas Weather-Ometer to filtered light with wet and dry cycles. The rate of degradation of each film was followed by determining the tear strength (see A.S.T.M. Method D1004–49T). The superior stability of films of the copolymer over films of unmodified polyethylene is shown in the following table:

*Atlas Weather-Ometer tests*

| Time | Tear Strength | |
|---|---|---|
| | Control Polyethylene | Copolymer of Ethylene/Allyl Salicylate (1.4%) |
| At start | 102 | 213 |
| After 500 hours | Brittle | 154 |
| After 1,000 hours | ----do---- | 26 |
| After 1,500 hours | ----do---- | 15 |

The control polyethylene was brittle after 500 hours whereas the copolymer retained toughness after 1500 hours.

The copolymers of the invention, as described above, possess superior resistance to degradation by light. This valuable property is particularly evident in copolymers which contain 1% or more of the salicyclic ester. However, the copolymers of this invention have a second valuable property, i.e., the property of screening out deleterious light rays in the wave length range of about 230 to 360 millimicrons. This property is shown by films of copolymers which have a much lower content of salicyclic ester.

The property of screening out ultraviolet light, principally in the region of 310 millimicrons, is particularly valuable in applications such as bottles, covers for display cases and the like. In applications of this kind where the ultraviolet screening effect is of primary value, and weathering characteristics are of secondary value, copolymers can be employed which contain only minor amounts of salicyclic ester, as little as 0.05% by weight. For example, a copolymer of 99.95% ethylene and 0.05% vinyl salicylate and a copolymer of 99.95% ethylene and 0.05% allyl salicylate are prepared by methods described earlier and the copolymers are formed into sheets of about 20 mils thickness. Sheets of these copolymers, which contain only 0.05% of the salicylic ester, absorb almost 100% of light in the region of 310 millimicrons, a wave length which is important in the ultraviolet spectrum of light. In other words, less than 1% of light of the 310 millimicron wave length passes through 20 mil sheets of copolymers which contain only about 0.05% of the salicylic ester. In contrast, at least 15% or more than 15 times as much light of this wave length passes through corresponding sheets of unmodified polyethylene.

Copolymers which contain minor amounts of the salicylic ester can be shaped into containers opaque to ultraviolet light such as bottles, which are useful for storing light-sensitive liquids or powders. Copolymers used for this purpose are, of course, not limited to compositions which contain 0.05% of the salicylic ester. Copolymers which contain, for example, 0.1%, 0.2% or 0.5% of vinyl salicylate or allyl salicylate, can be employed, particularly in sheets or films of less than 20 mils thickness.

The present invention is generic to copolymers of ethylene and vinyl salicylate or allyl salicylate containing at least 50% by weight of ethylene and 0.05% by weight of vinyl salicylate or allyl salicylate.

For applications in which it is desirable that the films or sheets have good resistance to degradation by light, copolymers are preferred which contain at least 50% by weight of ethylene and about 1-50% by weight of vinyl salicylate or allyl salicylate. Copolymers of these compositions have a satisfactory combination of physical properties, ultraviolet screening effect and resistance to degradation by light.

For applications employing copolymers crosslinked by chelation, copolymers are used which contain at least 50% by weight of ethylene and preferably 3-50% by weight of the salicylic ester. With copolymers containing less than about 3% by weight of the salicylic ester, the effects obtained by subsequent chelation produce only minor changes in polymer properties. Copolymers containing more than about 50% by weight of the salicylate ester become increasingly brittle. Such polymers are unsuitable for the preparation of self-supporting films and they lack the pliability which is necessary in the polymer prior to chelation, since chelation results in increased stiffness. For these reasons, the copolymers preferred for crosslinking by chelation are those which contain, by weight of the total polymeric composition, from about 3% to about 50% of polymerized vinyl salicylate or allyl salicylate. The best balance of film-forming and chelating properties is found in the range of from about 5% to about 35% of polymerized salicylic ester. The ethylene/vinyl salicylate copolymers are preferred over the ethylene/allyl salicylate copolymers because of their outstanding value for the preparation of shaped structures having superior physical properties.

The chelate crosslinking procedure, although preferably applied to copolymers with 3% by weight or more of the salicylic ester, can, of course, be applied to all of the copolymers, even copolymers with small amounts of the salicylic ester. As noted earlier, the physical properties, such as toughness, flexibility, and the like, of copolymers which contain small quantities of the salicylic ester do not show as great a change as a result of chelate crosslinking as is shown by the properties of copolymers of higher salicylic ester content.

The ethylene/vinyl- or allyl salicylate copolymers can be prepared by known methods of polymerizing vinyl monomers, such as emulsion or solution polymerization, using known polymerization initiators of the free radical-producing type such as ammonium persulfate, hydrogen peroxide, organic peroxides, azonitriles, and the like. Under controlled conditions, it is possible to obtain in a reproducible manner copolymers of varying composition, depending upon the relative proportions of comonomers in the reaction medium. The copolymers are obtained as essentially colorless materials ranging in physical appearance from tough transparent resins to spongy solids. Their homogeneity is improved by extracting the crude product with a suitable solvent such as acetone to remove unpolymerized material and low molecular weight polymers.

The copolymers of this invention have high molecular weights, as indicated by their inherent viscosity (determined in tetrahydronaphthalene solutions of 0.1% concentration at 125° C.) which normally is at least 0.40. The more useful polymers have inherent viscosities exceeding 0.5, and attaining or even exceeding 1.5. The copolymers are generally soluble, either at room temperature or at elevated temperature, in a fairly wide variety of organic solvents including aromatic hydrocarbons such as benzene, toluene, the xylenes, tetrahydronaphthalene, ethers such as di-n-butyl ether, cyclic ethers such as tetrahydrofuran, ketones such as cyclohexanone, etc.

The salicylate group-containing copolymers of this invention can be crosslinked through chelation with any chelating polyvalent metal. The polyvalent metals known to form chelates readily are listed in the book by Martell and Calvin entitled "Chemistry of the Metal Chelate Compounds" (Prentice-Hall, Inc., New York, 1952), particularly at p. 182. Preferred examples of metals suitable for chelation with the above-described copolymers are aluminum and zirconium, because their chelates are colorless and have particularly good resistance to hydrolysis. Other very suitable metals are zinc, magnesium, and beryllium, whose chelates are also colorless; and titanium, copper, manganese and iron, when colored products are desired or not objectionable. Still other useful polyvalent metals include cobalt, nickel, chromium, cadmium, boron, tin, scandium, vanadium, and bismuth.

For the purpose of preparing the chelate crosslinked polymers by transchelation, that is, reaction of the polymeric polyligand with a polyvalent metal chelate of a volatile chelating agent, any suitable chelating agent boiling below about 300° C. at 760 mm. will serve. The preferred ones are those most available and most economical, which are in general the 1,3-diketones, the β-ketoesters and the aromatic α-hydroxy aldehydes and esters. Specifically preferred chelating agents are acetylacetone, 3-methyl 2,4-pentanedione, 3-ethyl-2,4-pentanedione, propionylacetone, trifluoroacetylacetone, 2-furoylacetone, 2-thenoylacetone, ethyl acetoacetate, butyl acetoacetate, salicylaldehyde, methyl salicylate, and the like. Thus, there may be employed for reaction with the copolymers of vinyl salicylate or allyl salicylate with ethylene the following representative polyvalent metal chelates of volatile chelating agents in addition to those illustrated in the examples: bis(ethyl acetoacetato)zinc; bis(acetylacetono)nickel; bis(ethyl acetoacetato)cobalt II; bis(ethyl acetoacetato)copper II; bis(salicylaldehydo)copper II; bis(acetylacetono)magnesium; tetrakis(ethyl acetoacetato)zirconium; tris(methyl salicylato)aluminum; bis(methyl salicylato)beryllium; bis(ethyl acetoacetato)-magnesium; diisopropyl bis(ethyl acetoacetato)titanate IV; bis(acetylacetono)manganese II; tris(ethyl acetoacetato)iron III; tris(acetylacetono)iron III; bis(1,1,1-trifluoro-3-benzylacetono)copper II; tris(2-furoyl)acetonoaluminum; and the like.

As already mentioned, a polymeric polyligand should preferably be treated with sufficient metal chelate to produce a final polymer containing at least 0.005 gram atom, and preferably from 0.01 to 0.06 gram atom of metal per 100 g. of chelated polymer. In this treatment and in the subsequent evaporation of the volatile chelating agent, no additional solvent is required in many cases, although an additional solvent is often desirable to provide a solution of convenient viscosity for the purpose of producing shaped articles. The solvent can be any volatile liquid which is substantially inert towards the two components of the mixture or solution. Suitable organic solvents include aromatic hydrocarbons, e.g., benzene, toluene or the xylenes, aliphatic alcohols, e.g., methanol, ethanol, n-butanol, acyclic or cyclic ethers, e.g., di-n-butyl ether, tetrahydrofuran, ketones, e.g., methyl isobutyl ketone, cyclohexanone, and the like. The quantity of solvent is not critical and needs only be sufficient to decrease the viscosity of the composition to a level practical for film casting or similar uses. The mixtures or solutions so obtained are stable towards gelation and can be stored for long periods of time. If some tendency to precipitation or gelation is noted on mixing the reactants, such tendency can be overcome by adding a slight excess of the volatile chelating agent, or of a different one having equivalent or greater chelating strength, to keep the chelated polymer in solution.

Shaped structures such as films cast from these compositions become tack-free rapidly upon air-drying, and even more rapidly upon baking, for example, at temperatures of 50° C. to 200° C. for from 15 minutes to two hours. These products consist of molecules of copolymer of vinyl or allyl salicylate with ethylene cross-linked through the six-membered chelate rings formed by the polyvalent metal and the salicylate groups. The resulting shaped polymers are flexible, tough and resistant to long exposures to air and light.

For the purpose of preparing chelate crosslinked polymers by the alcohol exchange method, the polyvalent metals, e.g., those listed above, are used as their alcoholates, preferably with volatile alkanols, e.g., with alkanols of one to four carbon atoms. Thus, there can be used aluminum trimethoxide, zirconium tetraethoxide, iron triisopropoxide, magnesium dibutoxide, zinc dimethoxide, copper dipropoxide, and the like. Sufficient metal alkoxide is used, in relation to the number of salicylic ester groups present to give a chelated polymer containing the proportions of metal specified above. The reaction is essentially irreversible and does not depend on the removal of the alcohol corresponding to the metal alcoholate to go to completion. It can take place at low temperatures, e.g., at room temperature or lower, but is preferably carried out at higher temperatures such as 100° C.–200° C. in order to maintain the chelated polymer in a state of plasticity sufficient to shape it into the desired structure. A solvent or reaction medium is not necessary but, if desired, inert solvents such as benzene or toluene can be used.

A modification of this method consists in treating a shaped structure, such as a film, filament or molded article, of the unchelated ethylene/salicylic ester copolymer with the polyvalent metal alcoholate, dissolved for example in the alcohol from which it is formed. In this procedure, chelation takes place at least at the surface of the object being treated, and can even take place throughout in the case of thin films or filaments.

The ethylene/vinyl salicylate and ethylene/allyl salicylate copolymers are useful as films, sheets, coatings or moldings, particularly in applications where solvent resistance and heat resistance are not essential. Specifically, they are useful as wrapping materials for food products such as meat, cheese, fish or poultry, as book covers, flexible wire coatings, fabric coatings, electrical insulation and sponges. Since the salicylate groups absorb ultraviolet light, the copolymers are useful as glass laminates, sunshades, ultraviolet light screens, protective coatings for paints and other similar applications. In view of their good resistance to embrittlement at low temperature, the ethylene/vinyl salicylate copolymers are well adapted as wrapping materials for use in refrigerators and freezers.

The chelated ethylene/vinyl salicylate and ethylene/allyl salicylate copolymers are also useful in the form of films, sheets, filaments, coatings and moldings for the same applications listed for the unchelated polymers. However, they have the added advantages of resistance to heat and organic solvents and of enhanced strength. Specific uses for the chelated polymers include can liners, electrical tape, temperature resistant laminates on glass fabric or fiber, useful as moisture-proof, non-deformable electrical insulating materials resistant to high temperatures, insulating materials for use at relatively high temperatures, fabric coatings, flexible materials for use in articles such as bags, hat covers, overshoes, and the like. They are further useful as reinforcement for plastics, as protective coatings for surfaces such as wood, porcelain and especially metals, e.g., refrigerators, autobodies, furniture and the like, and in the manufacture by molding or extruding of shaped objects such as tumblers, tableware, chips, tubes, novelty articles, and the like.

The foregoing detailed description has been given for clearness of understanding only and no unnecessary limitations are to be understood therefrom. The invention is not limited to the exact details shown and described for obvious modifications will occur to those skilled in the art.

We claim:

1. A copolymer of ethylene and a salicylate of the class consisting of vinyl and allyl salicylates, said copolymer containing in the polymerized form, by weight, 0.05–50% of the salicylate and at least 50% by weight of ethylene.

2. A copolymer of ethylene and a salicylate of the class consisting of vinyl and allyl salicylates, said copolymer containing in the polymerized form, by weight, 1–50% of the salicylate and at least 50% by weight of ethylene.

3. A copolymer of ethylene and a salicylate of the class consisting of vinyl and allyl salicylates, said copolymer containing in the polymerized form, by weight, 3–50% of the salicylate and at least 50% of ethylene.

4. A copolymer of ethylene and a salicylate of the class consisting of vinyl and allyl salicylates, said copolymer containing in the polymerized form, by weight, 5–35% of the salicylate and at least 50% of ethylene.

5. A copolymer of ethylene and vinyl salicylate containing in the polymerized form, by weight, 5–35% of the salicylate and at least 50% of ethylene.

6. A copolymer of ethylene and allyl salicylate containing in the polymerized form, by weight, 5–35% of the salicylate and at least 50% of ethylene.

7. A copolymer according to claim 1 containing up to 20% of a third polymerizable, terminally ethylenically unsaturated vinyl monomer.

8. A coating composition comprising a copolymer according to claim 1 in solution in a volatile organic solvent therefor, said copolymer containing up to 20% of a third polymerizable, terminally ethylenically unsaturated vinyl monomer.

9. A polyvalent metal chelate of the copolymer of claim 3 wherein said copolymer is cross-linked through said polyvalent metal present in six-membered chelate rings formed on different polymer chains, said metal being a common member of siad chelate rings, each of said rings having an atom of the polyvalent metal linked to both the carbonylic and phenolic oxygen atoms of a single salicylate ester unit and said copolymer containing between 0.005 and 0.15 gram atom of the metal per 100 grams of polymer weight.

10. A polyvalent metal chelate of the copolymer of claim 4 wherein said copolymer is cross-linked through said polyvalent metal present in six-membered chelate rings formed on different polymer chains, said metal being a common member of said chelate rings, each of said rings having an atom of the polyvalent metal linked to both the carbonylic and phenolic oxygen atoms of a single salicylate ester unit and said copolymer containing between 0.005 and 0.15 gram atom of the metal per 100 grams of polymer weight.

11. A polyvalent metal chelate of the copolymer of claim 5 wherein said copolymer is cross-linked through said polyvalent metal present in six-membered chelate rings formed on different polymer chains, said metal being a common member of said chelate rings, each of said rings having an atom of the polyvalent metal linked to both the carbonylic and phenolic oxygen atoms of a single salicylate ester unit and said copolymer containing between 0.005 and 0.15 gram atom of the metal per 100 grams of polymer weight.

12. A polyvalent metal chelate of the copolymer of claim 6 wherein said copolymer is cross-linked through said polyvalent metal present in six-membered chelate rings formed on different polymer chains, said metal being a common member of said chelate rings, each of said rings having an atom of the polyvalent metal linked to both the carbonylic and phenolic oxygen atoms of a single salicylate ester unit and said copolymer containing between 0.005 and 0.15 gram atom of the metal per 100 grams of polymer weight.

13. An aluminum chelate of the copolymer of claim 2 wherein said copolymer is cross-linked through aluminum present in six-membered rings formed on different polymer chains, the aluminum being a common member of said chelate rings, each of said rings having the aluminum linked to both the carbonylic and phenolic oxygen atoms of a single salicylate ester unit and said copolymer containing between 0.005 and 0.15 gram atom of aluminum per 100 grams of polymer weight.

14. An aluminum chelate of the copolymer of claim 4 wherein said copolymer is cross-linked through aluminum present in six-membered rings formed on different polymer chains, the aluminum being a common member of said chelate rings, each of said rings having the aluminum linked to both the carbonylic and phenolic oxygen atoms of a single salicylate ester unit and said copolymer containing between 0.005 and 0.15 gram atom of aluminum per 100 grams of polymer weight.

15. An aluminum chelate of the copolymer of claim 5 wherein said copolymer is cross-linked through aluminum present in six-membered rings formed on different polymer chains, the aluminum being a common member of said chelate rings, each of said rings having the aluminum linked to both the carbonylic and phenolic oxygen atoms of a single salicylate ester unit and said copolymer containing between 0.005 and 0.15 gram atom of aluminum per 100 grams of polymer weight.

16. An aluminum chelate of the copolymer of claim 6 wherein said copolymer is cross-linked through aluminum present in six-membered rings formed on different polymer chains, the aluminum being a common member of said chelate rings, each of said rings having the aluminum linked to both the carbonylic and phenolic oxygen atoms of a single salicylate ester unit and said copolymer containing between 0.005 and 0.15 gram atom of aluminum per 100 grams of polymer weight.

17. A nickel chelate of the copolymer of claim 5 wherein said copolymer is cross-linked through nickel present in six-membered rings formed on different polymer chains, the nickel being a common member of said chelate rings, each of said rings having the nickel linked to both the carbonylic and phenolic oxygen atoms of a single salicylate ester unit and said copolymer containing between 0.005 and 0.15 gram atom of nickel per 100 grams of polymer weight.

18. A zirconium chelate of the copolymer of claim 5 wherein said copolymer is cross-linked through zirconium present in six-membered rings formed on different polymer chains, the zirconium being a common member of said chelate rings, each of said rings having the zirconium linked to both the carbonylic and phenolic oxygen atoms of a single salicylate ester unit and said copolymer containing between 0.005 and 0.15 gram atom of zirconium per 100 grams of polymer weight.

19. A film of the copolymer of claim 1.

20. A film of the chelate of claim 9.

21. A coating composition comprising a copolymer according to claim 1 in solution in a volatile organic solvent therefor.

References Cited in the file of this patent

UNITED STATES PATENTS

| | | |
|---|---|---|
| 2,566,537 | Schmerling | Sept. 4, 1951 |
| 2,582,795 | Prentiss | Jan. 15, 1952 |
| 2,710,801 | Minsk | June 14, 1955 |

FOREIGN PATENTS

| | | |
|---|---|---|
| 582,899 | Great Britain | Dec. 2, 1946 |

UNITED STATES PATENT OFFICE

CERTIFICATE OF CORRECTION

Patent No. 2,933,474                      April 19, 1960

Carleton T. Handy et al.

It is hereby certified that error appears in the printed specification of the above numbered patent requiring correction and that the said Letters Patent should read as corrected below.

Column 1, line 47, for "nonomeric" read -- monomeric --; column 2, lines 10 to 14, and lines 24 to 29, the lower portion of each formula should appear as shown below instead of as in the patent:

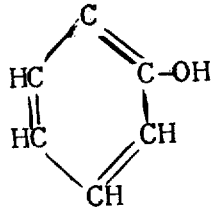

column 4, line 6, for "acoholysis" read -- alcoholysis --; line 62, for "contant" read -- constant --; column 5, line 53, for "copolyer" read -- copolymer --; line 58, for "potasisum" read -- potassium --; column 8, line 17, for "elongated" read -- elongation --; column 9, line 40, for "solicylate" read -- salicylate --; column 14, line 5, for "abolut" read -- about --; column 15, line 28, for "-benzylacetono" read -- -benzoylacetono --; same line, for "tris(2-furoyl)ace-" read -- tris[2-(furoyl)ace- --; column 17, line 25, for "siad" read -- said --.

Signed and sealed this 11th day of October 1960.

(SEAL)
Attest:
KARL H. AXLINE
Attesting Officer

ROBERT C. WATSON
Commissioner of Patents